United States Patent
Kiowsky et al.

(10) Patent No.: US 6,668,802 B2
(45) Date of Patent: Dec. 30, 2003

(54) VALVE ARRANGEMENT IN A FEED LINE TO DELIVER FUEL FROM A TANK TO AN INTERNAL COMBUSTION ENGINE

(75) Inventors: Harold Kiowsky, Germerswang (DE); Eleftherios Rodousakis, Munich (DE)

(73) Assignee: Eurocopter Deutschland GmbH, Donauwoerth (DE)

( * ) Notice: Subject to any disclaimer, the term of this patent is extended or adjusted under 35 U.S.C. 154(b) by 8 days.

(21) Appl. No.: 09/819,691

(22) Filed: Mar. 29, 2001

(65) Prior Publication Data

US 2001/0025629 A1 Oct. 4, 2001

(30) Foreign Application Priority Data

Mar. 29, 2000 (DE) ......................................... 100 15 576

(51) Int. Cl.$^7$ ............................................... F02M 37/04
(52) U.S. Cl. .................. 123/467; 123/510; 123/198 D; 137/549
(58) Field of Search ................................. 123/467, 516, 123/506, 456, 510, 198 D; 137/549

(56) References Cited

U.S. PATENT DOCUMENTS

| | | | | |
|---|---|---|---|---|
| 2,247,421 A | * | 7/1941 | Tabb et al. .................. | 123/467 |
| 3,742,926 A | * | 7/1973 | Kemp ......................... | 123/467 |
| 3,896,845 A | | 7/1975 | Parker | |
| 3,971,406 A | | 7/1976 | Inada | |
| 4,044,746 A | | 8/1977 | Kaye et al. | |
| 4,467,767 A | * | 8/1984 | Kampichler et al. ........ | 123/467 |
| 4,561,559 A | | 12/1985 | Rutan | |
| 4,577,606 A | * | 3/1986 | Bohringer et al. .......... | 123/467 |
| 5,074,272 A | * | 12/1991 | Bostick et al. ............... | 123/516 |
| 5,282,492 A | | 2/1994 | Angeli | |
| 5,295,469 A | * | 3/1994 | Kariya et al. ................ | 123/467 |
| 5,477,829 A | | 12/1995 | Hassinger et al. | |
| 5,511,528 A | * | 4/1996 | Iwanaga et al. ............. | 123/467 |
| 5,603,302 A | | 2/1997 | Minagawa et al. | |
| 5,623,910 A | | 4/1997 | Riggle | |
| 5,669,356 A | * | 9/1997 | Wall et al. ................... | 123/467 |
| 5,832,954 A | * | 11/1998 | Shafer ......................... | 123/467 |
| 5,924,445 A | * | 7/1999 | Ambrose et al. ........... | 137/549 |

FOREIGN PATENT DOCUMENTS

| | | |
|---|---|---|
| GB | 892036 | 3/1962 |
| JP | 2153256 | 6/1990 |

\* cited by examiner

*Primary Examiner*—Carl S. Miller
(74) *Attorney, Agent, or Firm*—Crowell & Moring LLP

(57) ABSTRACT

A valve arrangement is provided for a feed line to supply fuel from a tank to a combustion engine consisting of a valve housing with an inlet channel and outlet channel, and a valve with a movable valve head to seal the outlet channel from the inlet channel, whereby a feed pump is assigned to the feed line, and the valve head is in closed position when there is no feed pressure from the feed pump. The danger of feed line leakage for combustion engines that burn liquid fuel is eliminated using a coaxial second valve using no additional space to solve the problem. The other essentially coaxial valve within the main valve is in open position opposite the feed direction when the pressure at the outlet channel is greater than the feed pressure. The valve arrangement functions as a check valve when the combustion engine is running, and as an overpressure valve when it is off. The solution does not requiring additional installation space, and can be economically integrated into existing fuel systems without any substantial installation effort.

17 Claims, 2 Drawing Sheets

VALVE ARRANGEMENT IN A FEED LINE TO DELIVER FUEL FROM A TANK TO AN INTERNAL COMBUSTION ENGINE

BACKGROUND AND SUMMARY OF THE INVENTION

This application claims the priority of German Patent Document 100 15 576.6, filed in Germany, Mar. 29, 2000, the disclosure of which is expressly incorporated by reference herein.

The invention concerns a valve arrangement in a feed line to deliver fuel from a tank to an internal combustion engine. The valve arrangement consists of a valve housing with an inlet and outlet channel, and a valve with a movable valve head to seal the outlet channel from the inlet channel, whereby a feed pump is assigned to the feed line, and the valve head is in closed position when there is no feed pressure from the feed pump.

The tank system of a vehicle to supply the drive with liquid fuel consists of at least one tank that can be filled with fuel. The vehicle can be a motor vehicle (such as an automobile), watercraft, or an aircraft (such as an airplane or rotary-wing aircraft). The drive is provided by a combustion engine. The combustion engine can be an internal combustion engine or a propulsion unit. Both are supplied with liquid fuel (gas, kerosene). The fuel is conveyed by a feed pump from the tank in a feed line to the drive. There is a valve arrangement in the feed line between the feed pump and the combustion engine. When the combustion engine is not running, the valve arrangement closes the feed line, and prevents or delays the fuel level in the feed line from dropping quickly. This prior-art valve arrangement is designed as a check valve.

At locations with a hot climate, the fuel in the tank system expands when the drive stops after an operating phase. It is problematic when the fuel expands in the feed line that connects the tank with the combustion engine. The feed line is usually in the tank along with a feed pump, and it is connected to an injection module of the combustion engine. After the combustion engine stops, the pressure of the fuel extends the entire length of the feed line. When the outside temperature is high, the fuel is additionally heated, which causes impermissibly high pressure to be exerted on the feed line and the connected assemblies. There is therefore a danger of fuel leakage directly adjacent to the combustion engine that can be triggered by increased pressure in the feed line. The fuel conventionally leaks at the connecting sites of the feed line. There is danger of fire when fuel leaks from the feed line.

The problem of the invention is to eliminate the danger of leakage from the feed line for combustion engines that burn liquid fuel. This also involves not requiring additional space to solve the problem.

The problem is solved according to certain preferred embodiments of the invention by placing within the valve another essentially coaxial valve that is in open position against the feed direction when the pressure at the outlet channel side is greater than the feed pressure.

In certain preferred embodiments of the valve of the invention, there is an axial through-hole running through the valve head and its valve stem that represents a guide, and the through-hole has a valve seat at the mouth facing the outlet channel.

The other valve with its valve stem can be guided within this guide. Between the valve stem of the other valve and the wall of the through-hole, there is a gap that extends the length of the through-hole. One end of the other valve stem guided in the valve stem is designed as a valve cone that can be positioned to seal the valve seat of the through-hole by a resistance means. The valve cone can be opened against the feed direction. This produces a constructively simple and economical design.

In certain preferred embodiments of the valve of the invention, it is provided that the valve stem can be moved against a force of the resistance means in the guide.

In certain preferred embodiments of the valve of the invention, the resistance means is a spring, e.g. a spiral spring.

In certain preferred embodiments of the valve of the invention, it is suggested that the resistance means for the valve cone has a settable threshold for switching the other valve between open and closed position. When the threshold for e.g. a specific spring force of the resistance means is exceeded, the valve switches from the closed position to the open position. The threshold for the spring force is equivalent to a specific pressure in the feed line that is greater than the feed pressure.

Certain preferred embodiments of the invention advantageously enable a valve cone of a valve acting against the original feed direction to be placed in the valve head of a check valve. Advantageously, no additional installation space is required. Two coaxial valves are integrated in a common housing to form a single valve arrangement.

The valve arrangement according to the invention can work as a check valve when the combustion engine is running, and it can independently function as a pressure relief valve when the engine is not running. The valve according to the invention can be economically integrated into existing fuel systems without much installation effort.

Other objects, advantages and novel features of the present invention will become apparent from the following detailed description of the invention when considered in conjunction with the accompanying drawings.

DETAILED DESCRIPTION OF THE DRAWINGS

The valve arrangement according to the invention will be described using the example of a fuel system in an aircraft, i.e. a helicopter. The use of the valve arrangement according to the invention is not limited to aircraft but is also suitable for vehicles such as fuel-driven cars, or watercraft.

Figure 1:
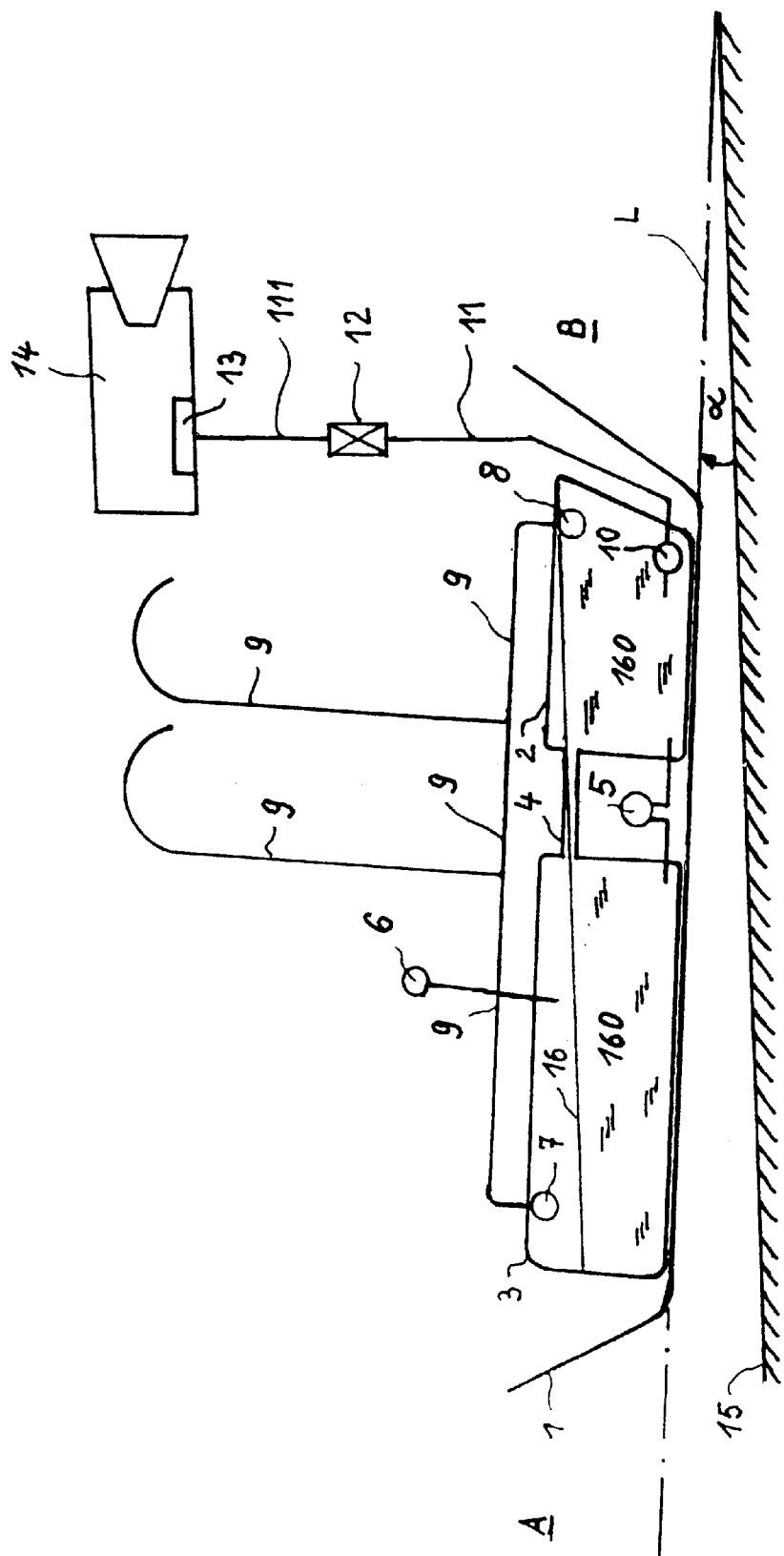
FIG. 1 is a schematic lengthwise sectional view of a tank system of a helicopter with a combustion engine and a delivery system for the fuel constructed according to preferred embodiments of the invention.

FIG. 1 shows a schematic lengthwise section of the tank system of a helicopter, the system for conveyance for the fuel, and a propulsion unit.

In the floor shell 1 of a helicopter cell, a main tank 3 and a feed tank 2 are arranged sequentially. The main tank 3 lies toward the cockpit A, and the feed tank 2 lies toward the rear B of the helicopter cell. The filling neck 6 for both tanks is in the main tank 3. Both tanks are connected by an overflow line 4. The overflow line 4 serves to balance the fuel level arising from changes due to the flight angle.

A fuel pump 5 with connecting lines also connects the main tank 3 with the feed tank 2. This ensures that the feed tank 2 always remains full while the main tank 3 becomes empty first.

The main tank 3 and feed tank 4 have self-sealing vent valves 7,8. Connected to both vent valves 7,8 are ventilation channels 9 that end outside.

In the feed tank 2, there is a feed pump 10 that is connected to a part of a feed line 11 for the fuel to flow. The valve arrangement 12 according to the invention is incorporated in the feed line. From the outlet channel of the valve arrangement 12, the other part of the feed line 111 leads to the injection system 13 of a propulsion unit 14. When the helicopter is resting on a flat surface 15, the floor L of the helicopter is always at an angle ∝ of approximately 3° in relation to the flat surface 15. This is illustrated by the fuel level 16.

When the propulsion unit 14 is on, the conveyance device, i.e. the feed pump 10, supplies fuel to the valve arrangement 12 by the feed line 11. The feed pump 10 builds feed pressure. When the feed pressure is reached, the valve arrangement 12 opens in the direction of flow, and the fuel can be conveyed via the feed line 111 to the injection system 13 of the propulsion unit 14. Embodiments are also contemplated with the feed pump 10 in the feed line 11.

Figure 2:
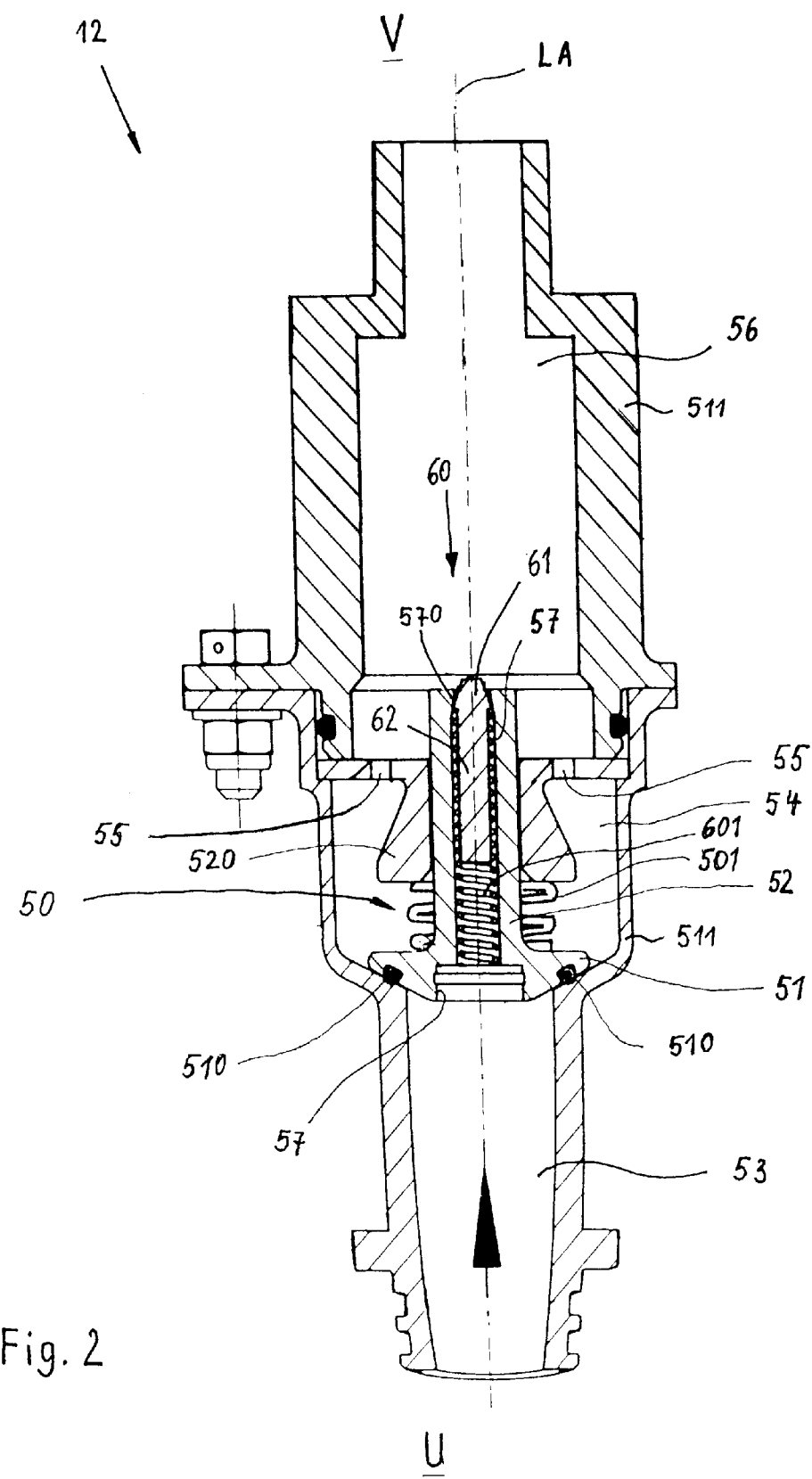
FIG. 2 is an enlarged sectional view of a valve arrangement constructed according to preferred embodiments of the invention.

FIG. 2 shows details of the design and function of the valve arrangement 12 according to the invention. When the propulsion unit 14 is operating, the pressure-side outlet of the feed pump 10 conveys fuel 160 at a relatively low pressure (feed pressure) through a feed line 11 into a valve 50 of the valve arrangement 12. The feed pressure of prior-art types of helicopters is known. The feed pressure from the feed pump 10 opens the valve 50 against the resistance of a resisting means 501. The resisting means 501 can e.g. be a spiral spring. Since the propulsion unit 14 is usually above the tank system, the valve 50 can also function when the resistance means 501 is not available. This would be an alternative that is not shown in FIG. 2. In such case, the weight of the fuel column between the valve arrangement 12 and the injection system 13 assumes the function of a resisting means at a standstill that needs to be overcome when the combustion engine is started.

When the valve 50 is open, the fuel 160 flows through the opened valve 50 from position U to position V.

When the pump 10 is operating, the valve head 51 with its seal 510 raises from the inside housing wall 511 of the valve arrangement 12 and moves the valve stem 52 connected to the valve head 51 in a guide 520 along the lengthwise axis LA of the valve 50. The fuel flows from position U of the inlet channel 53 via chamber 54 with channels 55 into the outlet channel 56 toward position V.

When the propulsion unit 14 is turned off, the feed pump 10 is also turned off by a control (not shown), i.e. the relatively low feed pressure drops. The valve 50 stops the direction of flow U–V. The seal 510 of the valve head 51 lies tightly against the inner housing wall 511. This causes the pressure to remain constant in the feed line 111 above the valve arrangement 12, i.e. on the side of position V of the feed line 111. Another valve 60 is integrated in valve 50, i.e. a valve 60 that opens or blocks the flow is integrated in the valve head 51 with the valve stem 52. To this end, a through-hole 57 runs lengthwise (axially) in the valve stem 52; the through-hole expands in a step in the valve head 51 and ends in the inlet channel 53. The valve 60 is in the through-hole 57 that connects the inlet channel 53 and outlet channel 56. Note that the wall at the end of the through-hole 57 is conical. This mouth area of the through-hole ends in the outlet channel 56.

The valve 60 is formed by a valve stem 62 that has a valve cone 61 at one end.

When the valve is closed, this valve cone 61 seals the through-hole 57 using resistance means 601 against the conical wall at the mouth area. The valve cone 61 opens against the force of resistance means 601 at the mouth area of the through-hole 57.

When the fuel (under feed pressure) flows through the valve 50 from position U to position V, the valve 60 is closed.

When the propulsion unit 14 is off and the pump 10 is hence not operating, the valve 50 remains closed. When the valve 50 is closed in this manner, the pressure can grow higher than the feed pressure in the section of the feed line 111 from environmental temperature as the fuel warms. The pressure in the feed line 111 between the valve arrangement 12 and injection system 13 rises and reaches a specific, settable limit for the valve 60. When the threshold is exceeded, the fuel presses the valve 60 into an open position against the resistance of a resistance means 601 so that fuel can escape from the side of the outlet channel 56 via a gap between the valve stem 62 and wall of the through-hole 57 into the inlet channel 53. The gap runs the length of the through-hole 57 up to below the valve cone 61. When the valve cone 61 is sealed, the gap is also sealed. The buildup of pressure on the valve 60 above the feed pressure opens the valve 60 so that the higher-pressure in the section of the feed line 111 can be attenuated. If the pressure falls below the threshold pressure on the side of the outlet channel 56, the valve 60 returns to its closed position, i.e. the valve cone 61 seals the valve seat 570 of the conical wall at the mouth of the hole 57. This separates the outlet channel 56 from the inlet channel 53. The threshold to be set is adjustable by setting e.g. the rigidity of the resistance means 601. The resistance means can e.g. be a spiral spring with a specific spring rigidity. Other e.g. electromechanical resistance means can be used, however. The threshold is determined by calculation or empirically, and set by resistance means.

The pressure between the valve arrangement 12 and pump 10 that is also high can also be compensated by returning fuel to the tank in a prior-art manner.

The solutions according to the invention advantageously prevent from damage the lines and components (pump, injection system) that can be subject to impermissible pressure. This clearly reduces the danger of leakage due to overpressure in the feed line.

Since the valve cone of an opposing check valve is in the valve head of a check valve, no additional installation space is required. The fact that additional installation space is not required for the fuel system is an important advantage that is attained by integrating two coaxial valves in a common housing to form a single valve. This arrangement 12 according to the invention with the two explained functions is called a "check overpressure valve" since it functions as a check valve e.g. during flight and as an over-pressure valve while resting. Another advantage of the solution is that the check over-pressure valve 12 can be economically integrated into the existing fuel systems without any substantial installation effort.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. A fuel supply assembly, comprising:
   a valve arrangement in a feed line to supply fuel from a tank to a combustion engine, said valve arrangement comprising:
      a valve housing with an inlet and outlet channel, and
      a main valve with a movable valve head to seal the outlet channel from the inlet channel, whereby a feed pump is assigned to the feed line, and the valve head is in a closed position when no feed pressure from the feed pump is operatively provided,
   wherein within the main valve, a second basically coaxial second valve is provided that is in an open position opposite a feed direction when pressure at the outlet channel is operatively greater than the feed pressure,
   wherein the valve arrangement is located between the tank and an injection system of the engine, and
   wherein the valve arrangement is arranged above the tank and below the engine.

2. A fuel supply assembly, comprising:
   a valve arrangement in a feed line to supply fuel from a tank to a combustion engine, said valve arrangement comprising:
      a valve housing with an inlet and outlet channel, and
      a main valve with a movable valve head to seal the outlet channel from the inlet channel, whereby a feed pump is assigned to the feed line, and the valve head is in a closed position when no feed pressure from the feed pump is operatively provided,
   wherein within the main valve, a second basically coaxial second valve is provided that is in an open position opposite a feed direction when pressure at the outlet channel is operatively greater than the feed pressure,
   wherein the valve arrangement is located between the tank and an injection system of the engine, and
   wherein the valve head is arranged upstream from an associated valve stem.

3. A fuel supply assembly according to claim 1, wherein the valve head is arranged upstream from an associated valve stem.

4. A fuel supply assembly according to claim 1, wherein an axial through-hole is provided in the main valve running through the valve head and a valve stem that represents a guide and forms a valve seat, and the second valve with a valve stem can be guided within the guide while maintaining a gap along the through-hole; one end of the valve stem of the second valve being designed as a valve cone that can be positioned to seal the valve seat by a resistance member, and can be opened against the feed direction against a force of the resistance member.

5. A fuel supply assembly according to claim 4, wherein the valve stem of the second valve can move against the force of the resistance member in the guide.

6. A fuel supply assembly according to claim 4, wherein the resistance member is a spiral spring.

7. A fuel supply assembly according to claim 5, wherein the resistance member is a spiral spring.

8. A fuel supply assembly according to claim 4, wherein a threshold can be set using the resistance member to switch the second valve between a closed and the open position.

9. A fuel supply assembly according to claim 5, wherein a threshold can be set using the resistance member to switch the second valve between a closed and the open position.

10. A fuel supply assembly according to claim 6, wherein a threshold can be set using the resistance member to switch the second valve between a closed and the open position.

11. A fuel supply assembly according to claim 7, wherein a threshold can be set using the resistance member to switch the second valve between a closed and the open position.

12. A fuel supply assembly according to claim 1, wherein said second valve includes a spring loaded valve member facing an outlet said of the main valve.

13. A fuel supply assembly according to claim 12, wherein said spring loaded valve member has a conical valve head engageable to close the outlet side of the main valve with respect to an inlet side during normal fuel feeding operations.

14. A helicopter, comprising:
   a valve arrangement in a feed line to supply fuel from a tank to a combustion engine, said valve arrangement comprising:
      a valve housing with an inlet and outlet channel, and
      a main valve with a movable valve head to seal the outlet channel from the inlet channel, whereby a feed pump is assigned to the feed line, and the valve head is in a closed position when no feed pressure from the feed pump is operatively provided,
   wherein within the main valve, a second basically coaxial second valve is provided that is in an open position opposite a feed direction when pressure at the outlet channel is operatively greater than the feed pressure, and
   wherein the valve arrangement is arranged above the tank and below the engine.

15. A helicopter according to claim 14, wherein an axial through-hole is provided in the main valve running through the valve head and a valve stem that represents a guide and forms a valve seat, and the second valve with a valve stem can be guided within the guide while maintaining a gap along the through-hole; one end of the valve stem of the second valve being designed as a valve cone that can be positioned to seal the valve seat by a resistance member, and can be opened against the feed direction against a force of the resistance member.

16. A helicopter according to claim 15, wherein the resistance member is a spiral spring.

17. A helicopter according to claim 15, wherein a threshold can be set using the resistance member to switch the valve between a closed and the open position.

* * * * *